(12) United States Patent
Sekiai et al.

(10) Patent No.: US 8,155,763 B2
(45) Date of Patent: Apr. 10, 2012

(54) OPERATION CONTROL METHOD, OPERATION CONTROL DEVICE, AND OPERATION CONTROL SYSTEM

(75) Inventors: Takaaki Sekiai, Hitachi (JP); Satoru Shimizu, Hitachi (JP); Akihiro Yamada, Tokai (JP)

(73) Assignee: Hitachi, Ltd., Tokyo (JP)

( * ) Notice: Subject to any disclaimer, the term of this patent is extended or adjusted under 35 U.S.C. 154(b) by 648 days.

(21) Appl. No.: 12/279,350

(22) PCT Filed: Jan. 18, 2007

(86) PCT No.: PCT/JP2007/050682
§ 371 (c)(1),
(2), (4) Date: Aug. 14, 2008

(87) PCT Pub. No.: WO2007/116590
PCT Pub. Date: Oct. 18, 2007

(65) Prior Publication Data
US 2009/0012632 A1 Jan. 8, 2009

(30) Foreign Application Priority Data
Mar. 31, 2006 (JP) .............................. 2006-096373

(51) Int. Cl.
*G05B 13/02* (2006.01)
(52) U.S. Cl. .......................................... 700/31; 703/22
(58) Field of Classification Search .................... 700/29, 700/31; 703/1–28; 706/16
See application file for complete search history.

(56) References Cited

U.S. PATENT DOCUMENTS

| | | | |
|---|---|---|---|
| 5,166,873 A * | 11/1992 | Takatsu et al. | 700/31 |
| 5,347,446 A | 9/1994 | Iino et al. | |
| 5,448,681 A * | 9/1995 | Khan | 706/23 |
| 5,930,136 A * | 7/1999 | Nakajima et al. | 700/48 |
| 6,529,887 B1 | 3/2003 | Doya et al. | |

(Continued)

FOREIGN PATENT DOCUMENTS

JP 04-256102 9/1992
(Continued)

OTHER PUBLICATIONS

Kyoka Gakushu, (Reinforcement Learning) published by Morikita Shuppan (Morikita Publishing) in Dec. 2000; authored by Richard S. Sutton and Andre G. Barto; translated jointly by Sadayoshi Mikami and Masaaki Minagawa.

*Primary Examiner* — Kakali Chaki
*Assistant Examiner* — Sheela S Rao
(74) *Attorney, Agent, or Firm* — Antonelli, Terry, Stout & Kraus, LLP.

(57) ABSTRACT

Operation control method employable in a control apparatus controls a control object by calculating an operation amount to maximize or minimize an evaluation value obtained from a control deviation of the control object from a target value. The operation control method includes the steps of: establishing a model for simulating a property of the control object; calculating the operation amount to maximize or minimize an evaluation value based on a control deviation of the model as a target; calculating an evaluation value based on a control deviation in controlling the control object by the operation amount; and determining an operation amount change width defined by a difference between current step operation amount and next step operation amount, based on the deviation of the control object from the model in the evaluation value of the control deviation.

9 Claims, 8 Drawing Sheets

U.S. PATENT DOCUMENTS

| | | |
|---|---|---|
| 2003/0120360 A1 | 6/2003 | Yasui et al. |
| 2006/0129250 A1 | 6/2006 | Yasui et al. |
| 2006/0184465 A1* | 8/2006 | Tsujino et al. .................. 706/15 |
| 2007/0022068 A1* | 1/2007 | Linsker ........................... 706/23 |

FOREIGN PATENT DOCUMENTS

| | | |
|---|---|---|
| JP | 06-095706 | 4/1994 |
| JP | 08-083104 | 3/1996 |
| JP | 09-128011 | 5/1997 |
| JP | 10-074188 | 3/1998 |
| JP | 10-214112 | 8/1998 |
| JP | 2000-035956 | 2/2000 |
| JP | 2001-154705 | 6/2001 |
| JP | 2001-236102 | 8/2001 |
| JP | 2003-005804 | 1/2003 |
| JP | 2004-094939 | 3/2004 |

* cited by examiner

FIG. 2

| OPERATION TERMINAL NAME | OPERATION AMOUNT CHANGE WIDTH | UNIT |
|---|---|---|
| A | 1 | — |
| B | 2 | — |
| ... | ... | ... |

| OPERATION TERMINAL NAME | INITIAL VALUE | UPPER LIMIT | LOWER LIMIT | UPDATE RATIO | |
| | | | | $\alpha$ | $\beta$ |
|---|---|---|---|---|---|
| A | 0.5 | 2 | 0 | 0.75 | 1 |
| B | 0.5 | 2 | 0 | 0.75 | 1 |
| ... | ... | ... | ... | ... | ... |

50

| DIFFERENCE OF CONTROL AMOUNT AND TARGET VALUE | EVALUATION VALUE |
|---|---|
| 0–5 | +30 |
| 6–10 | +20 |
| ... | ... |
| 26–30 | −20 |
| ≥31 | −30 |

| DIFFERENCE OF EVALUATION VALUE | OPERATION AMOUNT CHANGE WIDTH |
|---|---|
| 0—10 | 10 |
| 11—20 | 5 |
| 20—30 | 2.5 |
| ... | ... |

OPERATION CONTROL METHOD, OPERATION CONTROL DEVICE, AND OPERATION CONTROL SYSTEM

TECHNICAL FIELD

The present invention relates to an operation control device/apparatus and method which adapt unsupervised learning.

BACKGROUND ART

In recent years, the technique called reinforcement learning is studied vigorously in the field of unsupervised learning. The reinforcement learning is known as a framework of the learning control which generates an operation signal to environment such as a control object so that a measurement signal obtained from the environment may become desirable through a trial-and-error interaction with the environment.

The reinforcement learning has a learning function which generates an operation signal to the environment so that the expected value of the evaluation value obtained from the present state to the future may become the maximum, with a clue of a scalar evaluation value (in the reinforcement learning, called the reward) calculated using the measurement signal obtained from the environment. Methods of implementing such a learning function include algorithms, such as Actor-Critic, Q-learning, and real-time Dynamic Programming, for example.

There is a framework called Dyna-architecture as a framework of the reinforcement learning into which the above-mentioned technique is developed. This is the method of learning beforehand what kind of operation signal should be better to be generated for a model which simulates a control object, and of determining the operation signal to be applied to the control object using this learning result. Dyna-architecture also has a model adjustment function which decreases an error between the control object and the model.

Patent Document 1 discloses the technology to which the reinforcement learning is applied. In the technology, there are provided two or more reinforcement learning modules which are a group of systems each possessing a model and a learning function. A responsibility signal which takes a larger value for a smaller prediction error between the model and the control object in each of the reinforcement learning modules is calculated, and an operation signal generated from each of the reinforcement learning modules is weighted in proportion to the responsibility signal. In this way, the operation signal to be applied to the control object is determined.

Patent Document 1: JP-2000-35956A

DISCLOSURE OF THE INVENTION

Problems to be Solved by the Invention

When the property of a control object is complicated and it is difficult to employ a model which can simulate the property completely, the model which constitutes the above-mentioned Dyna-architecture might differ from the property of the control object. In this case, even if an effective operation method to the model is learned using the technology disclosed by Patent Document 1, the operation method might not become effective for the control object. The operational condition of the control object might even get worse, if the operation signal based on the learned operation method is applied to the control object.

The present invention is made in view of the above circumstances and provides an operation control apparatus and an operation control method which allow operation of a control object without causing adverse affect on the operational condition of the control object, even when the deviation of the real system from the model (model error) arises.

Means for Solving the Problems

An operation control method according to one embodiment of the present invention is employable in a control apparatus for controlling a control object by calculating operation amount to maximize or minimize an evaluation value obtained on the basis of a control deviation defined by deviation of control amount of the control object from a target value of the control object.

The operation control method includes the steps of: establishing a model for simulating a property of the control object; calculating operation amount to maximize or minimize an evaluation value on the basis of a control deviation of the model as a target; calculating an evaluation value based on a control deviation in controlling the control object by the operation amount; and determining operation amount change width defined by a difference between operation amount of a current step and operation amount to be determined at a next step, based on the deviation of the evaluation value of the control deviation of the control object from the evaluation value of the control deviation of the model.

Advantages of the Invention

According to an embodiment of the present invention, the control object can be operated without causing adverse affect on the operational condition of the control object, even when a model error arises.

BRIEF DESCRIPTION OF THE DRAWINGS

FIG. 2 is a table illustrating a mode of data stored in a generation parameter storing unit;

FIG. 3 is a chart illustrating a screen image displayed on an image display apparatus;

DESCRIPTIONS OF REFERENCE NUMERALS

10: image display apparatus, 20 an external input apparatus, 30: keyboard, 40: mouse, 100: control object, 200: control apparatus, 300: operation signal generator, 400: model unit, 500, 510: evaluation value calculator, 600: operation signal generation parameter storing unit, 700: operation signal generation parameter updating unit, 800: model parameter storing unit, 900: model parameter updating unit

BEST MODE FOR CARRYING OUT THE INVENTION

Figure 1:
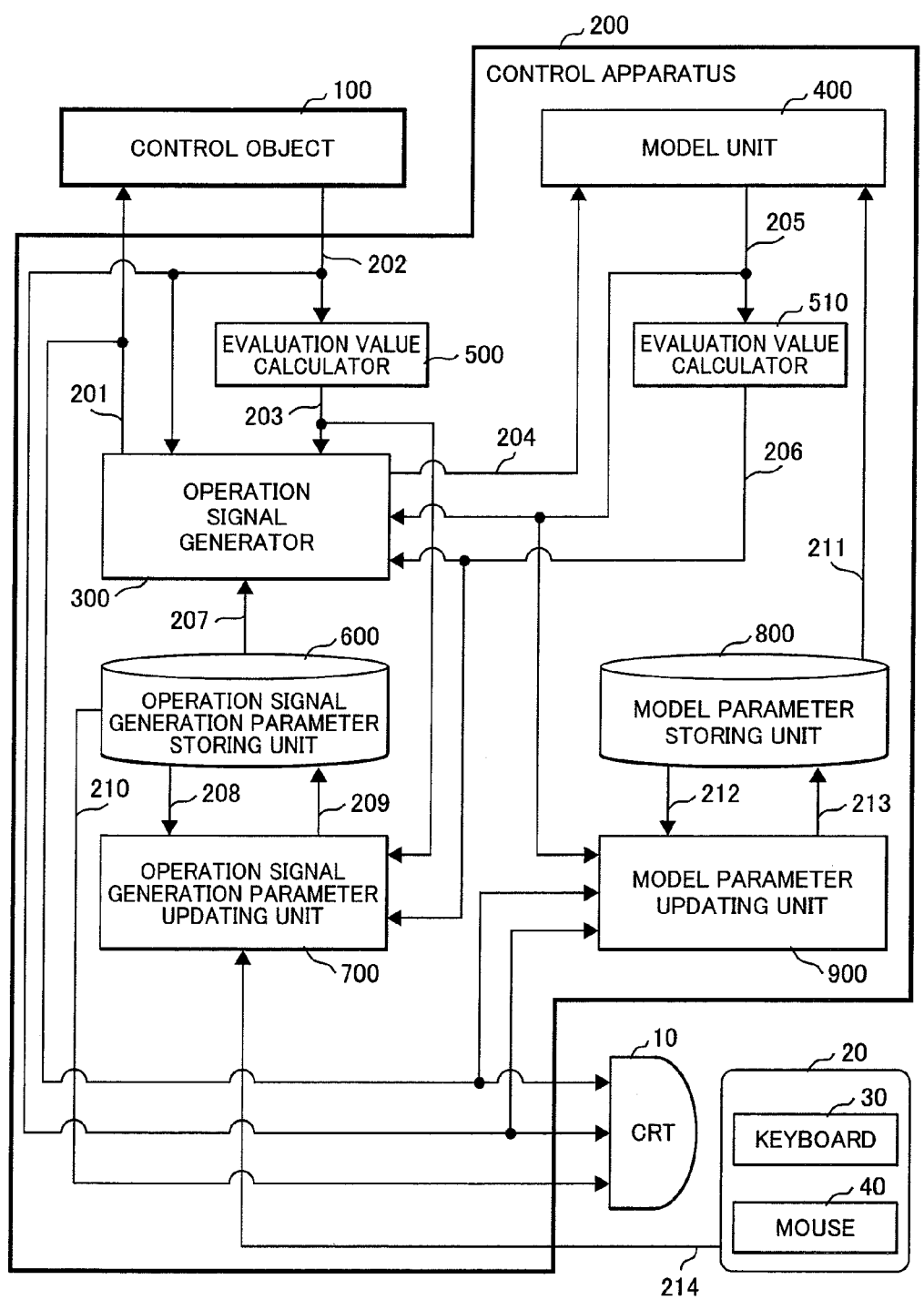
FIG. 1 is a diagram illustrating a control apparatus according to an embodiment of the present invention applied to a control object.

Hereinafter, an example for carrying out the present invention is explained, with reference to the accompanying drawings. FIG. 1 is a diagram illustrating a control apparatus 200 according to an embodiment of the present invention applied to a control object 100.

An operation signal generator 300 provided in the control apparatus 200 generates an operation signal 201 to be applied to the control object 100. An evaluation value calculator 500 calculates an evaluation value signal 203 using a measurement signal 202 obtained from the control object 100. The operation signal generator 300 receives the evaluation value signal 203.

The operation signal generator 300 has a function for generating the operation signal 201 so that total of the expected value of the evaluation value signal 203 from the present state to the future may become the maximum or the minimum. The following explains the case where the operation signal generator 300 generates the operation signal 201 so that total of the expected value of the evaluation value signal 203 may become the maximum.

The evaluation value calculator 500 generates the evaluation value signal 203 corresponding to the deviation of the measurement signal 202 from the target value. For example, when the measurement signal 202 is in agreement with the target value, the evaluation value signal 203 is set to "1", and when the measurement signal 202 is not in agreement with the target value, the evaluation value signal 203 is set to "0." Alternatively, the evaluation value signal 203 is set such that the evaluation value signal 203 is in inverse proportion to the deviation of the measurement signal 202 from the target value. Namely, the evaluation value is closer to the target value as the numeric value is larger like +30, and the evaluation value is farther away from the target value as the numeric value is smaller like −30, as described later in FIG. 5.

Figures 11, 12:
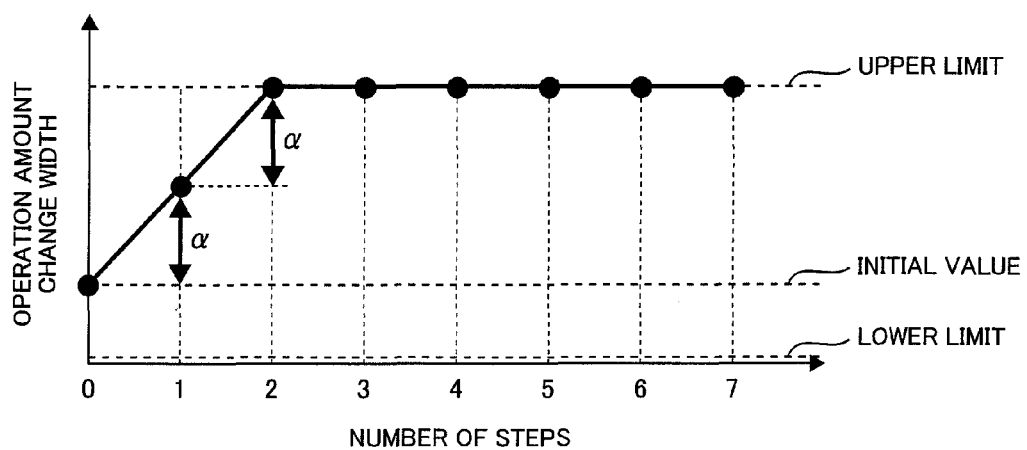
FIG. 11 is a chart illustrating relationship of a number of steps and an operation amount change width.
FIG. 12 is a table illustrating an example of evaluation value calculation.

The evaluation value calculation in this case can adopt plural methods. An example of the evaluation value calculation is shown in FIG. 12. The example possesses a table in which the difference between the control amount and the target value and the evaluation value are listed in a corresponding manner. The evaluation value can be generated with reference to the table. Alternatively, the evaluation value can be calculated by setting the evaluation value as a function of the difference of the control amount and the target value.

The implementation of the operation signal generator 300 can be practiced by employing reinforcement learning. In the reinforcement learning, the operation signal 201 is generated by trial and error in the early stage of learning. Then, the operation signal 201 is generated so that the evaluation value signal 203 may become larger as the learning is advanced.

Such a learning algorithm can employ algorithm such as Actor-Critic and Q-learning, for example.

The framework called Dyna-architecture is employed for the control apparatus shown in FIG. 1. The framework possesses a model unit 400 which simulates the control object 100, and the operation signal generator 300 learns the generation method of the operation signal 201 for the model unit 400 beforehand, and generates the operation signal 201 using the result of learning.

The operation signal generator 300 possesses a function to generate an operation signal 204 to be fed to the model unit 400, and to receive a measurement signal 205 and an evaluation value signal 206 from the model unit 400. The evaluation value signal 206 is calculated in an evaluation value calculator 510 using the measurement signal 205. The evaluation value calculator 510 possesses the same function as the evaluation value calculator 500.

The operation signal generator 300 determines the operation signal 201 to be applied to the control object 100, with reference to the data 207 stored in an operation signal generation parameter storing unit 600.

FIG. 2 is a table illustrating a mode of data 610 stored in the operation signal generation parameter storing unit 600. As shown in FIG. 2, the operation signal generation parameter storing unit 600 stores the data on the name of an operation terminal provided in the control object 100, the operation amount change width per cycle, and the unit used. The operation terminal can increase or decrease the operation amount in the range of the operation amount change width.

Although the case described in FIG. 2 possesses plural pieces of operation terminals, the number of the operation terminal may be one. In FIG. 2, the operation amount change width is described for every operation terminal, alternatively, however, plural operation terminals can be put together to one group and the sum of the operation amount change width for the group of the operation terminals may be controlled within a limit.

The limiting value of the operation amount change width of FIG. 2 is determined in an operation signal generation parameter updating unit 700.

A setting value necessary for the processing of the parameter update is inputted from an external input apparatus 20 possessing a keyboard 30 and a mouse 40. The information is displayed on an image display apparatus 10 such as CRT. An operator of the control object 100 inputs a setting value 214 using the image display apparatus 10 and the external input apparatus 20.

Figure 4:
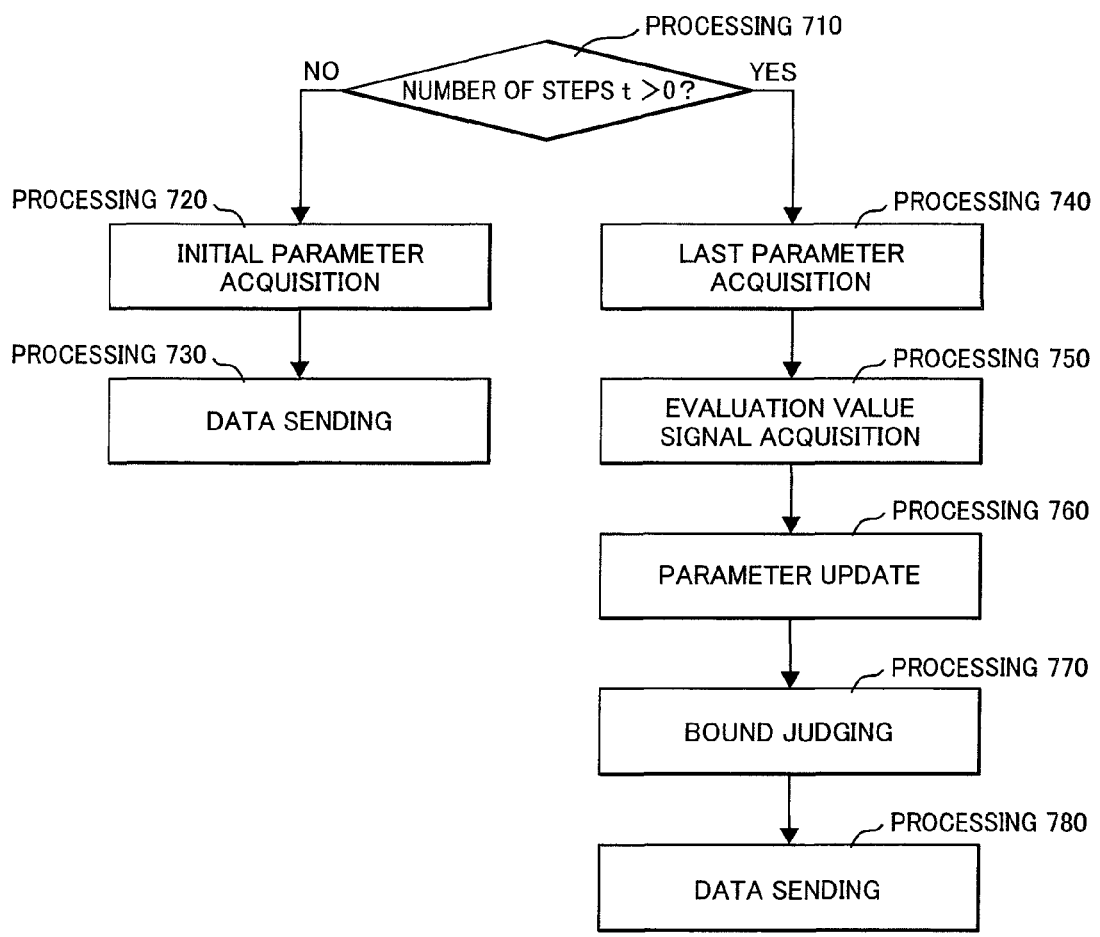
FIG. 4 is a flowchart illustrating processing of a generation parameter updating unit.

FIG. 3 is a chart illustrating a screen image displayed on an image display apparatus 10. On the present screen, the operator can set up a data 50 including an initial value, an upper limit, a lower limit, and an update ratio of the operation amount change width of the operation terminal. The directions for use of the setting values set up here are explained using FIG. 4. FIG. 4 is a flowchart illustrating processing of the generating signal generation parameter updating unit 700. In the following, the content of the processing in FIG. 4 is explained.

In Processing 710, it is determined whether the number of steps t is greater than zero. When the number of steps is zero (0) (in the case of NO), Processing 720 is carried out, and when the number of steps is greater than zero (0) (in the case of YES), Processing 740 is carried out. The number of steps is the number of times that the operation signal applied to the control object 100 is changed. The number of steps is zero (0) at the initial value, and increases by one (1) whenever an operation is practiced.

In Processing 720, the initial value set up in FIG. 3 is acquired.

In Processing 730, the initial value acquired in Processing 720 is sent to the generation parameter storing unit 600 as data 209.

In Processing 740, the last operation signal generation parameter stored in the generation parameter storing unit 600 is acquired as data 208.

In Processing 750, the evaluation value signal 203 and the evaluation value signal 206 are acquired.

In Processing 760, the operation amount change width is changed using Equation 1. In Equation 1, t stands for number of steps, G(t) stands for operation amount at step t, $r_1(t)$ stands for a value of the evaluation value signal 203, $r_2(t)$ stands for a value of the evaluation value signal 206, and $f(r_1(t), r_2(t))$ is a function of variables $r_1(t)$ and $r_2(t)$.

$$G(t+1)=G(t)+f(r_1(t),r_2(t)) \quad \text{(Equation 1)}$$

An example of the function $f(r_1(t), r_2(t))$ in Equation 1 is given by a function of Equation 2.

$$f(r_1(t),r_2(t))=\alpha-\beta(|r_1(t)-r_2(t)|) \quad \text{(Equation 2)}$$

In Processing 770, when G(t+1) calculated by using Equation 1 and Equation 2 exceeds the upper limit set up in FIG. 3, the value of the upper limit is set to G(t+1), and when G(t+1) calculated is smaller than the lower limit set up in FIG. 3, the value of the lower limit is set to G(t+1).

Finally, in Processing 780, G(t+1) obtained in Processing 770 is sent to the operation signal generation parameter storing unit 600 as the data 209.

Figures 13, 14:
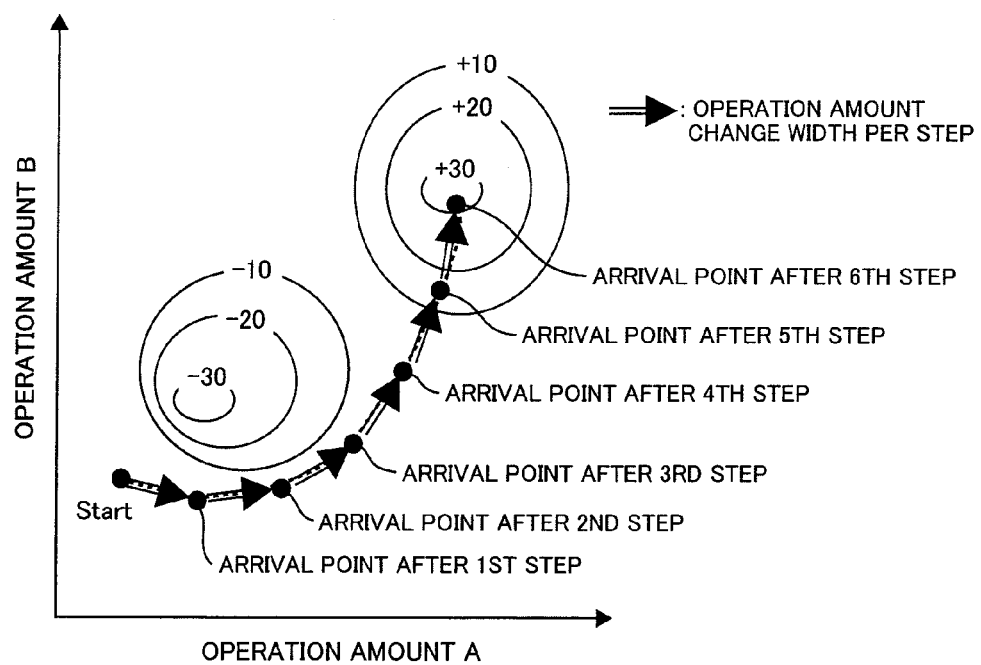
FIG. 13 is a table illustrating an example of determining operation amount.
FIG. 14 is a chart illustrating an example of a displayed screen of relationship of an operation amount space and an evaluation value.

The operation amount change width may be calculated in the form of a function like Equation 2. Alternatively, the operation amount may be determined with reference to a table stored, in which the difference of the evaluation value signals 203 and 206 and the operation amount change width G(t+1)−G(t) are tabulated in a corresponding manner as shown in FIG. 13.

In this way, since the operation amount change width is calculated from the difference of the evaluation value 206 based on the control deviation of the model and the evaluation value 203 based on the control deviation in controlling the control object, the control object can be operated without causing adverse affect on the operational condition of the control object. Furthermore, a flexible control is realizable according to deviation of the real system from the model.

By making the operation amount change width small when the difference of the evaluation values is large, and by making the operation amount change width large when the difference of the evaluation values is small, the operation amount can be changed safely when the deviation from the model is large, and the operation amount can be changed quickly when the deviation from the model is small.

Since the deviation of the real system from the model is greatly influenced when the operation amount change width is increased, balancing between changing the operation amount quickly and causing adverse affect on the operational condition of the control object can be achieved by setting up the upper limit to the operation amount change width.

In a model parameter storing unit 800, the parameter necessary to constitute the model unit 400 is stored. When the model unit 400 is a physical model, the physical constants necessary to constitute the physical model are stored in the model parameter storing unit 800. For example, when the control object 100 is a thermal power generation plant, values such as a heat transfer rate are stored.

A model parameter updating unit 900 reads a parameter 212 stored in the model parameter storing unit 800, modifies the parameter so that the properties of the control object and the model may be in agreement, sends a modified parameter 213 to the model parameter storing unit 800, thereby updating the model parameter. For example, when the control object 100 is the thermal power generation plant, using the technology disclosed by JP-10-214112 A, JP-2001-154705 A, etc., the model parameter updating unit 900 sets up a model parameter 211 to the model unit 400, and updates the parameter of the model.

Figure 5:
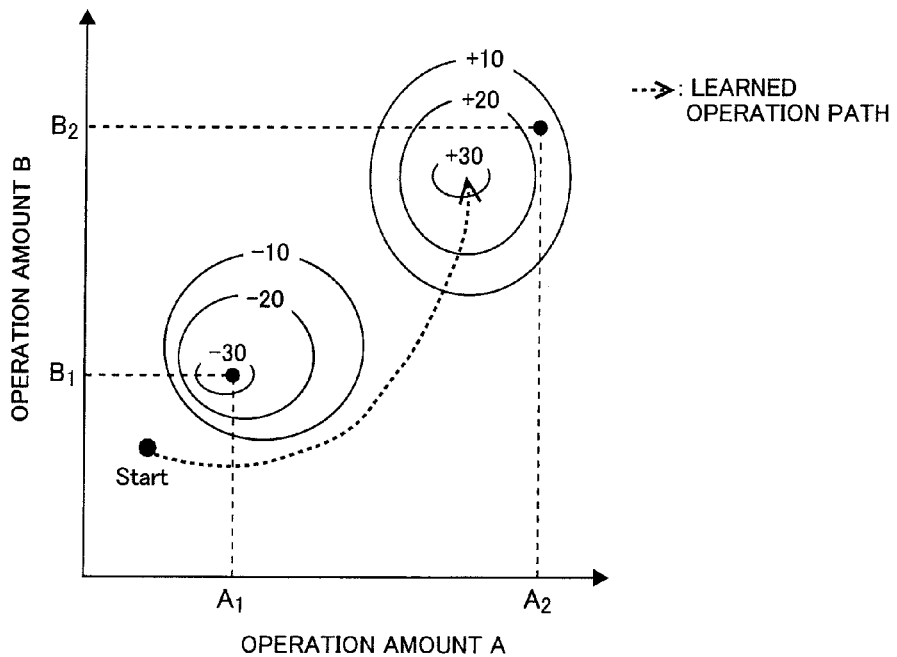
FIG. 5 is a chart illustrating a property of a model.
Figure 6:
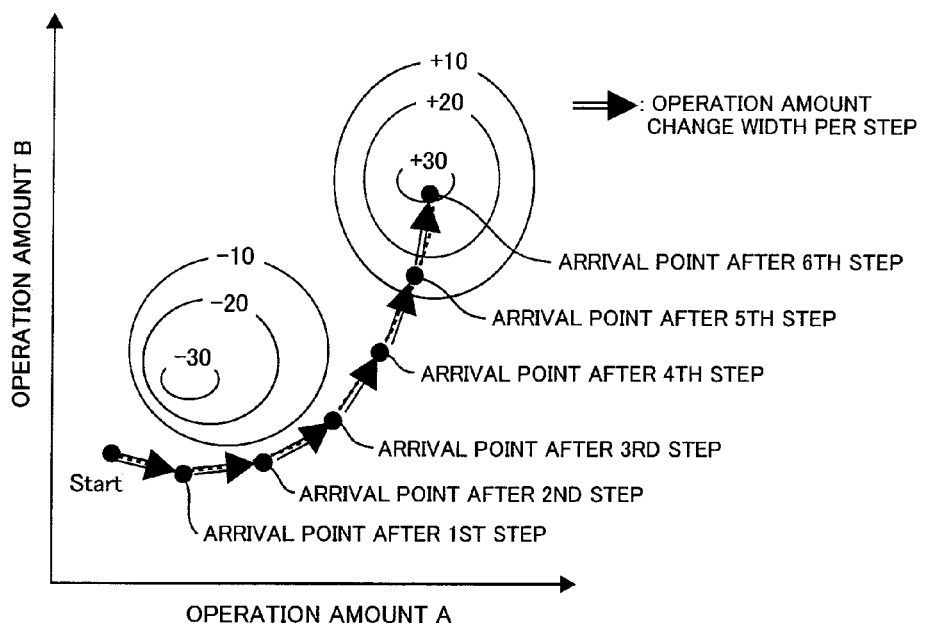
FIG. 6 is a chart illustrating an arrival point for every step.
Figure 7:
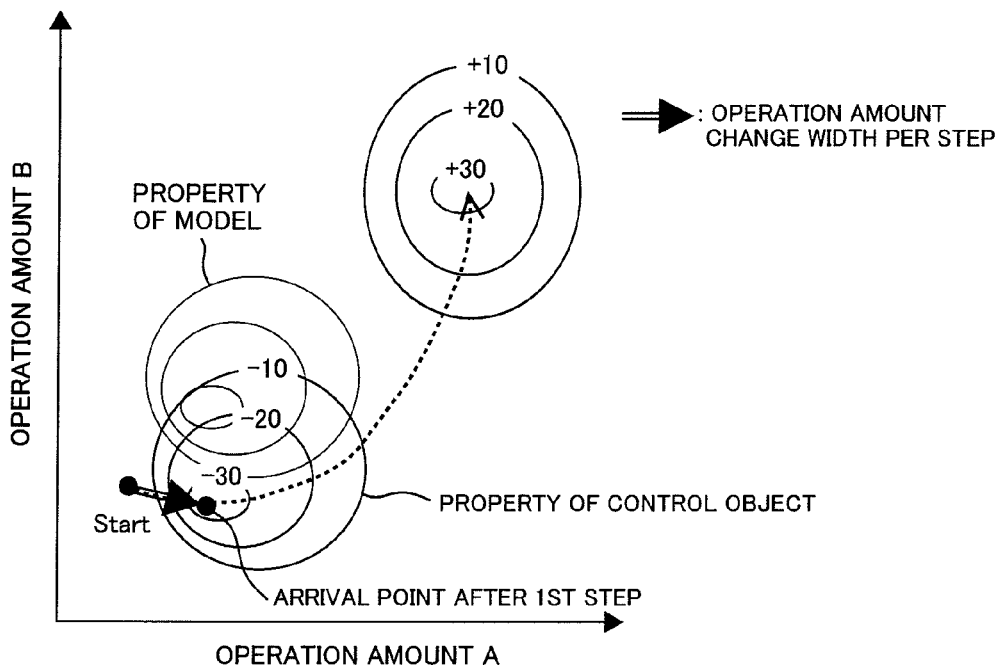
FIG. 7 is a chart illustrating difference between a property of the control object and a property of the model.

FIGS. 5-7 are charts explaining the problem expected to be generated when the control apparatus in related art is applied to the control object 100.

FIG. 5 shows the relationship of the space of operation amount and the evaluation value obtained. For example, when a value of the operation amount A is $A_1$ and a value of the operation amount B is $B_1$, the evaluation value obtained is −30 when the operation amount $A_1$ and $B_1$ are inputted into the model unit 400. The evaluation value obtained is +10 when the operation amount $A_2$ and $B_2$ is inputted.

Behavior that the total of the expected value of the evaluation value becomes the maximum avoids the area where the evaluation value is negative and goes to the area where the evaluation value is positive, taking a path such as indicated by the dotted line in FIG. 5.

FIG. 6 is a chart illustrating an operation amount change width by one behavior shown by an arrow. In this chart, the operation amount change width in every behavior is set constant. In this way, the path from the starting point to the point where the evaluation value becomes +30 is reached by six steps.

Here, the case where the model and the control object possess different properties is discussed. FIG. 7 is a chart illustrating an example in which the model and the control object possess different properties. As shown in FIG. 7, the conditions of the operation amount that yields a negative evaluation value differ by the model and the control object. In this case, if operation is performed following the operation method learned by the model, the evaluation value after the first step becomes −30, leading to an undesirable state.

Figure 8:
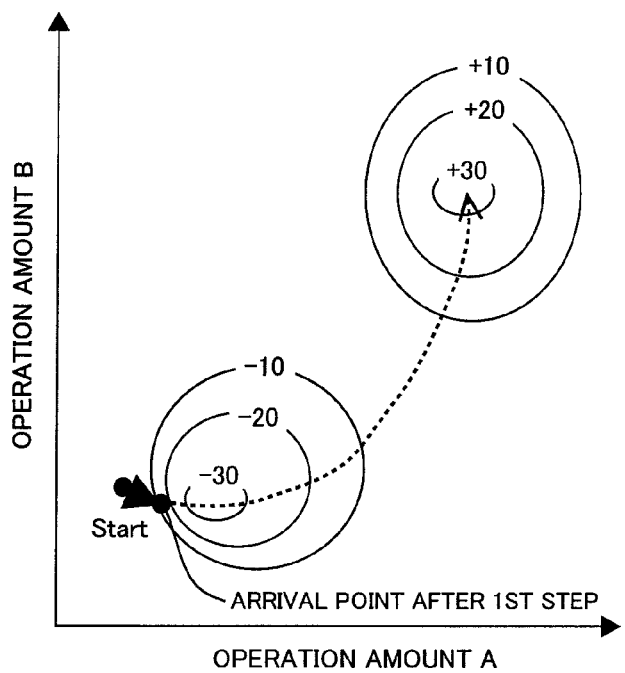
FIG. 8 is a chart illustrating an operation method according to an embodiment of the present invention.
Figure 9:
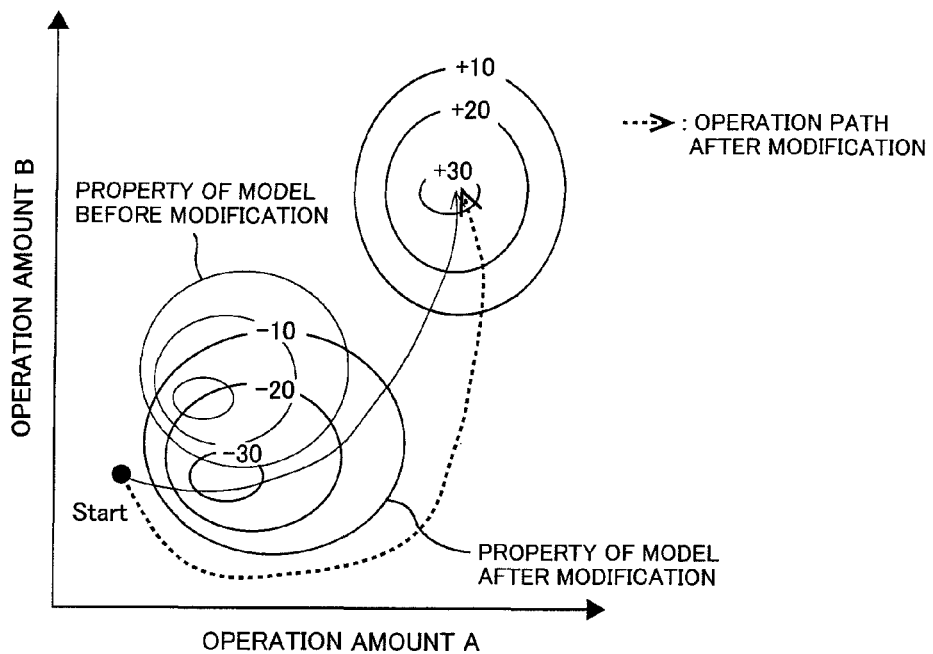
FIG. 9 is a chart illustrating a property of the model after modification.
Figure 10:
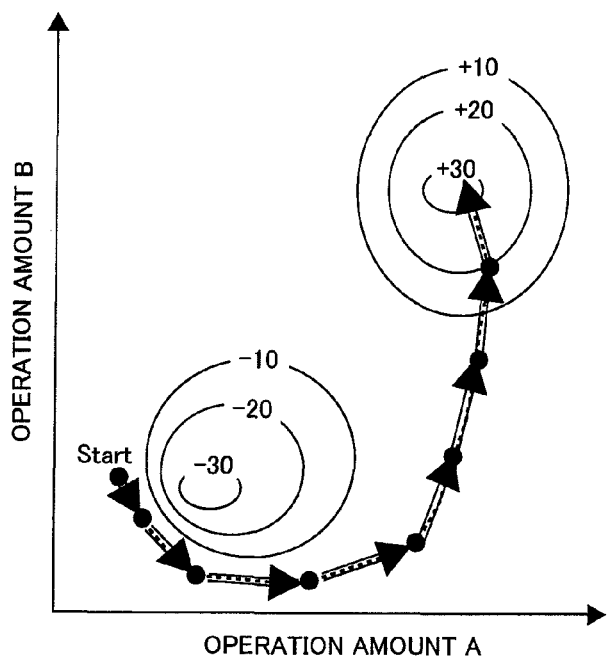
FIG. 10 is a chart illustrating an operation path after modification in controlling a control object.

FIGS. 8-10 are charts explaining the effect when the control apparatus according to an embodiment of the present invention is applied to a plant 100. In the control apparatus according to an embodiment of the present invention, the operation amount change width is not fixed but variably determined through the processing of FIG. 3.

By setting the initial value small, the operation amount change width of the first step can be made small. As a result, as shown in FIG. 8, the evaluation value after the first step becomes −10. The value −10 is superior to the value −30 which is obtained after the first step by the method in related art.

In this way, by making small the operation amount change width in the beginning stage of the operation, the control object moves to the operational condition resembling the initial state; therefore, the safety of the control object can be maintained.

By the operation of the first step, the control apparatus 200 obtains the information that the property of the control object 100 and the property of the model unit 400 are different. Using the measurement signal 202 from the control object 100, and the output signal 205 from the model unit 400, the model parameter updating unit 900 updates the parameter stored in the model parameter storing unit 800 so that the property of the model unit 400 and the property of the control object 100 may be in agreement. When the property of the model and the property of the control object are different, the operation signal 201 is returned so that the control object may return to the initial state ("Start" in FIG. 8).

In this way, the control object can be controlled safely, by modifying the model when the difference of the evaluation values is greater than the predetermined value, or by following the model when the deviation of the real system from the model is smaller than the predetermined value.

FIG. 9 shows the relationship between the space of operation amount and the evaluation value obtained from the model after modification. For the model after modification, behavior that the total of the expected value of the evaluation value becomes the maximum avoids the area where the evaluation value is negative and goes to the area where the evaluation value is positive, taking a path such as indicated by the dotted line in FIG. 9. The operation path differs in the case where the model before modification is employed and in the case where the model after modification is employed.

FIG. 10 shows the path when controlling the control object 100 using the operation path after modification.

In an embodiment of the present invention, when the evaluation value obtained by having performed operation to the control object is in agreement with the evaluation value obtained when the model is targeted, the operation amount change width is increased. As a result, as shown in FIG. 10, the arrow becomes longer gradually.

FIG. 11 shows the relationship of the number of steps and the operation amount change width in the operation execution of FIG. 10.

Since both the evaluation value of the model and the evaluation value from the control object are zero (0), the second term in Equation 2 is zero (0). Therefore, the operation amount change width increases by α per step.

The operation signal 201 is displayed on CRT 10 of FIG. 1. The data of the operation amount change width etc. which are the data 210 stored in the operating signal generation parameter storing unit 600, can also be displayed. The control amount 202 of the control object 100 can also be displayed. CRT10 can display on the screen the relationship of the space of operation amount and the evaluation value, as shown in FIGS. 5-10.

An example of the screen displaying the relationship of the space of operation amount and the evaluation value is shown in FIG. 14. The control apparatus 100 sets up the operation amount of plural operations applied to the control object on plural axes, respectively, and creates image information in which the start point and arrival point of each operation applied to the control object are displayed, and the arrival point of the operation at the previous step and the start point of the operation at the next step are connected. The control apparatus 100 displays the created image information on CRT10. Accordingly, the amount of variation of each operation can be easily grasped by contrast with the whole operation. The connection from the start point to the arrival point is displayed by an arrow.

The control apparatus 200 possesses the model 400 which simulates the property of the control object, the evaluation value calculator 510 of the model which calculates the evaluation value based on the control deviation in controlling the model as a target, and the evaluation value calculator 500 of the control object which calculates the evaluation value based on the control deviation in controlling the control object. The control apparatus 200 calculates the difference of the evaluation value of the model and the evaluation value from the control object when each operation is performed, creates the display data to be displayed correspondingly to the display of each operation, and sends the created display data to CRT10.

In this way, a model error can be grasped at the same time as performing operation, by displaying the difference of the evaluation value of the model and the evaluation value from the control object in performing each operation, correspondingly to each operation display.

As stated above, by applying the operation control apparatus of the present invention to the control object, the operation amount change width is made small immediately after the operation starts, and it is confirmed that the operation method learned for the model is effective also in the control object. Then, the operation amount change width is gradually increased, after it turns out that the property of the control object and the property of the model are analogous to each other and that the operation method learned for the model is effective also in the control object.

Consequently, even when the property of the model and the property of the control object have a difference, a risk of degradation can be reduced in operation of the control object.

Also when a model error arises, the control object can be operated without causing adverse affect on the operational condition of the control object.

The invention claimed is:

1. An operation control method employed in a control apparatus for controlling a control object by calculating an operation amount comprising an operating signal to the control object to make one of maximization and minimization of an evaluation value calculated from a control amount obtained on the basis of a control deviation defined by deviation of the control amount measured from the control object from a target value of the control object, the operation control method comprising the steps of:

establishing a model for simulating a property of the control object;

calculating the operation amount to make one of maximization and minimization of an evaluation value on the basis of a control deviation of the model as a target, and applying the operation amount to the control object;

calculating an evaluation value based on a control deviation in controlling the control object by the operation amount; and determining an operation amount change width defined by a difference between operation amount of a current step and operation amount to be determined at a next step, based on the deviation of an evaluation value of the control deviation of the control object from an evaluation value of the control deviation of the model.

2. The operation control method according to claim 1, wherein the operation amount change width is made small when the deviation of the evaluation value is large, and made large when the deviation of the evaluation value is small.

3. The operation control method according to claim 1, wherein an upper limit is set to the operation amount change width.

4. The operation control method according to claim 1, wherein the model is modified when the deviation of the evaluation value is greater than a predetermined value.

5. An operation control apparatus for controlling a control object measured from a plant control object by calculating an operation amount comprising an operating signal to the plant control object to make one of maximization and minimization of an evaluation value calculated from a control amount obtained on the basis of a control deviation defined by deviation of control amount from a target value of the control object, the operation control apparatus comprising:

a model for simulating a property of the plant control object;

a model evaluation value calculator for calculating an evaluation value of the model based on a control deviation in controlling the model as a target;

an operation signal generator for calculating the operation amount to make one of maximization and minimization of an evaluation value of the model;

a control object evaluation value calculator for calculating an evaluation value of the plant control object based on a control deviation in controlling the plant control object with the use of the operation amount; and an operation signal updating unit for determining an operation amount change width defined by a difference between operation amount of a current step and operation amount to be determined at a next step, based on an evaluation value of the control deviation of the model and an evaluation value of the control deviation of the control object, wherein, said operation signal generator outputs the operation amount determined by the operation signal updating unit to the plant control object.

6. The operation control apparatus according to claim 5, wherein the operation signal generator sets a small value to the operation amount change width when the deviation of the evaluation value is large, and sets a large value to the operation amount change width when the deviation of the evaluation value is small.

7. The operation control apparatus according to claim 5, wherein the operation signal updating unit possesses an upper limit in setting the operation amount change width.

8. The operation control apparatus according to claim 5 further comprising a model parameter updating unit for modifying the model when the deviation of the evaluation value is greater than a predetermined value.

9. An operation control system comprising:

a control apparatus for controlling a control object by performing a plurality of operations to the control object using a control amount measured from the control object; and a display apparatus, wherein the control apparatus includes:

a model for simulating a property of the control object;

an evaluation value calculator for calculating an evaluation value calculated from the control amount of the model based on a control deviation in controlling the model as a target; and an evaluation value calculator for calculating an evaluation value of the control object based on a control deviation in controlling the control object, and wherein the control apparatus sets up operation amount of a plurality of operations performed to the control object on a plurality of axes respectively, creates image information to display a start point and an arrival point of each of the plural operations performed to the control object and to display connection between an arrival point of a previous step and a start point of a next step, and sends the created image information to the display apparatus, and wherein concurrently, the control apparatus calculates a difference of the evaluation value of the model in performing each of the plural operations and the evaluation value of the control object, creates display data to be displayed correspondingly to the display of the each of the plural operations, and sends the created display data to the display apparatus.

* * * * *